(12) United States Patent
Howson et al.

(10) Patent No.: US 12,163,623 B2
(45) Date of Patent: Dec. 10, 2024

(54) AUTOMATIC LUBRICATION SYSTEM FOR KINEMATIC LINKAGE

(71) Applicant: Caterpillar Inc., Peoria, IL (US)

(72) Inventors: Brian C. Howson, Bolingbrook, IL (US); Mark J. Roeder, Geneva, IL (US); Cameron D. Jensen, Shorewood, IL (US); Timothy A. Vik, Hopewell, IL (US); Aaron R. Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 379 days.

(21) Appl. No.: 17/591,846

(22) Filed: Feb. 3, 2022

(65) Prior Publication Data

US 2023/0243466 A1    Aug. 3, 2023

(51) Int. Cl.
*F16N 29/02* (2006.01)
*E02F 3/34* (2006.01)
*E02F 9/24* (2006.01)
*F16N 7/38* (2006.01)

(52) U.S. Cl.
CPC ............ *F16N 29/02* (2013.01); *E02F 3/3405* (2013.01); *E02F 9/24* (2013.01); *F16N 7/385* (2013.01); *F16N 2250/42* (2013.01)

(58) Field of Classification Search
CPC ........ F16N 29/02; F16N 7/385; E02F 3/3405; E02F 9/006
See application file for complete search history.

(56) References Cited

U.S. PATENT DOCUMENTS

| | | | |
|---|---|---|---|
| 2014/0153997 A1* | 6/2014 | Ditzler | E02F 9/2275 403/38 |
| 2018/0017210 A1* | 1/2018 | Letscher | F16N 29/02 |
| 2019/0120424 A1* | 4/2019 | Gratton | G01C 19/16 |
| 2019/0263341 A1* | 8/2019 | Gustafson | F01M 1/02 |
| 2020/0018440 A1* | 1/2020 | Shiratani | E02F 9/0858 |
| 2020/0217048 A1* | 7/2020 | Kumar | E02F 9/268 |
| 2020/0407941 A1* | 12/2020 | Strashny | E02F 9/00 |
| 2021/0025134 A1* | 1/2021 | Shiratani | F16N 29/02 |
| 2022/0090355 A1* | 3/2022 | Yasuda | E02F 9/006 |

FOREIGN PATENT DOCUMENTS

| | | |
|---|---|---|
| DE | 20113362 | 1/2002 |
| DE | 102016213102 A1 | 1/2018 |
| DE | 102019210805 A1 | 2/2020 |
| JP | 2000-74292 A | 3/2000 |
| JP | 2010-203206 A | 9/2010 |
| JP | 5174742 B2 | 4/2013 |
| JP | 2020-117867 A | 8/2020 |

OTHER PUBLICATIONS

German Search Report for German Patent Appln. No. 0 2023 101 729.2, mailed Aug. 2, 2023 (5 pgs).

* cited by examiner

*Primary Examiner* — Michael R Mansen
*Assistant Examiner* — Mark K Buse
(74) *Attorney, Agent, or Firm* — Leydig, Voit & Mayer, Ltd

(57) ABSTRACT

A mechanical machine can include one or more kinematic linkages having kinematic joints that movably couple first and second rigid links and can include an automatic lubrication system to lubricate the kinematic joints. In an aspect, the automatic lubrication system is configured to monitor operational aspects of the machine such as machine operational data and geometric position and to dynamically determine timing and/or quantity of lubricant to direct and introduce to the kinematic joints.

20 Claims, 6 Drawing Sheets

AUTOMATIC LUBRICATION SYSTEM FOR KINEMATIC LINKAGE

TECHNICAL FIELD

This patent disclosure relates generally to a mechanical machine that includes one or more kinematic linkages having one or more kinematic joints and, more particularly, relates to an automatic lubrication system for lubricating the one or more kinematic joints

BACKGROUND

Mechanical machines often comprise one or more kinematic linkages that enable motion of the machine to perform various tasks. A kinematic linkage may include one or more rigid bodies or links that are joined together by a kinematic joint so that the links can move with respect to each other. Examples of pivot joints include pin joints, also referred to as revolute joints, in which two rigid links are joined by a cylindrical pin that is inserted through a circular aperture defined by structural eyes formed on the two rigid links. The two rigid links can articulate with respect to each other by pivoting or rotating about a pin axis associated with the pin. A common example of a pin joint may be a hinge. Other examples of pivot joints associated with a machine may be ball and socket joints. And, more broadly, other examples of kinematic joints include sliding joints that enable two rigid bodies to slide with respect to each other. Moreover, more complex mechanical machines may be made of several kinematic linkages that include several kinematic joints to enable complex motions of the machine to perform the desired tasks.

Because kinematic joints involve two structurally rigid links that move with respect to each other, the kinematic joints may require periodic lubrication to reduce friction and prevent wear or deterioration of the kinematic joint. Typical lubricants may include fluids or semisolid materials like grease or oil that are characterized by a viscosity that enables relative motion between the rigid links while reducing friction and possibly preventing thermal heating of the joint. Complex mechanical machines in which the kinematic joints may be subjected to significant forces and loads may be associated with a lubrication system that automatically introduces the lubricant to the kinematic joint. Conventional lubrication systems typically introduce lubricant to the plurality of kinematic joints at regular periods and in fixed quantities or amounts. The present application is directed to an improved lubrication system for dynamically introducing lubricant to the kinematic joints on a complex mechanical machine.

SUMMARY

The disclosure describes, in one aspect, a mechanical machine includes a first kinematic linkage having a first kinematic joint movably coupling together a first rigid link and a second rigid link and a second kinematic linkage including a second kinematic joint movably coupling together a third rigid link and a fourth rigid link. The mechanical machine also includes an automatic lubrication system in fluid communication with the first kinematic joint and with the second kinematic joint to deliver lubricant to the first kinematic joint second kinematic joint. The mechanical machine further includes a plurality of machine sensors disposed to monitor articulation of the first kinematic joint and articulation of the second kinematic joint and that are in communication with an electronic controller. The electronic controller is programmed to estimate a first cumulative tribological effect associated with the first kinematic joint based on articulation of the first kinematic joint and direct the automatic lubrication system to direct lubricant to the first kinematic joint if the first cumulative tribological effect meets or exceeds a first tribological effect threshold. The electronic controller is also programmed to estimate a second cumulative tribological effect associated with the second kinematic joint based on articulation of the second kinematic joint and to direct the automatic lubrication system to introduce lubricant to the second kinematic joint if the second cumulative tribological effect meets or exceeds a second tribological effect threshold.

In another aspect, there is disclosed a mechanical machine that may include a kinematic linkage having one or more kinematic joints coupling together a first rigid link and a second rigid link. To periodically lubricate the kinematic linkage, the mechanical machine can include an automatic lubrication system in fluid communication with the kinematic joint. One or more machine sensors are disposed about the mechanical machine to determine a relative angular position of the kinematic joint. The mechanical machine also includes an electronic controller in electronic communication with the machine sensors and that is programmed to compare the relative angular position of the kinematic joint with a lubricant introduction position. Based on the comparison of the relative angular position and the lubricant introduction position, the electronic controller may direct the automatic lubrication system to deliver lubricant to the kinematic joint.

In a further aspect, there is disclosed a method of automatically lubricating a kinematic joint coupling a first rigid link and a second rigid link of a kinematic linkage. The method involves articulating the kinematic joint to a relative angular position between the first rigid link and the second rigid link and sensing the relative angular position of the kinematic joint with one or more machine sensors. The method then compares the relative angular position of the kinematic joint with a lubricant introduction position that is predetermined and associated with the kinematic joint. Based on the comparison between the relative angular position of the kinematic joint with the first lubricant introduction position, the method may direct lubricant to the kinematic joint if the relative angular position corresponds to the lubricant introduction position.

DETAILED DESCRIPTION

Figure 1:
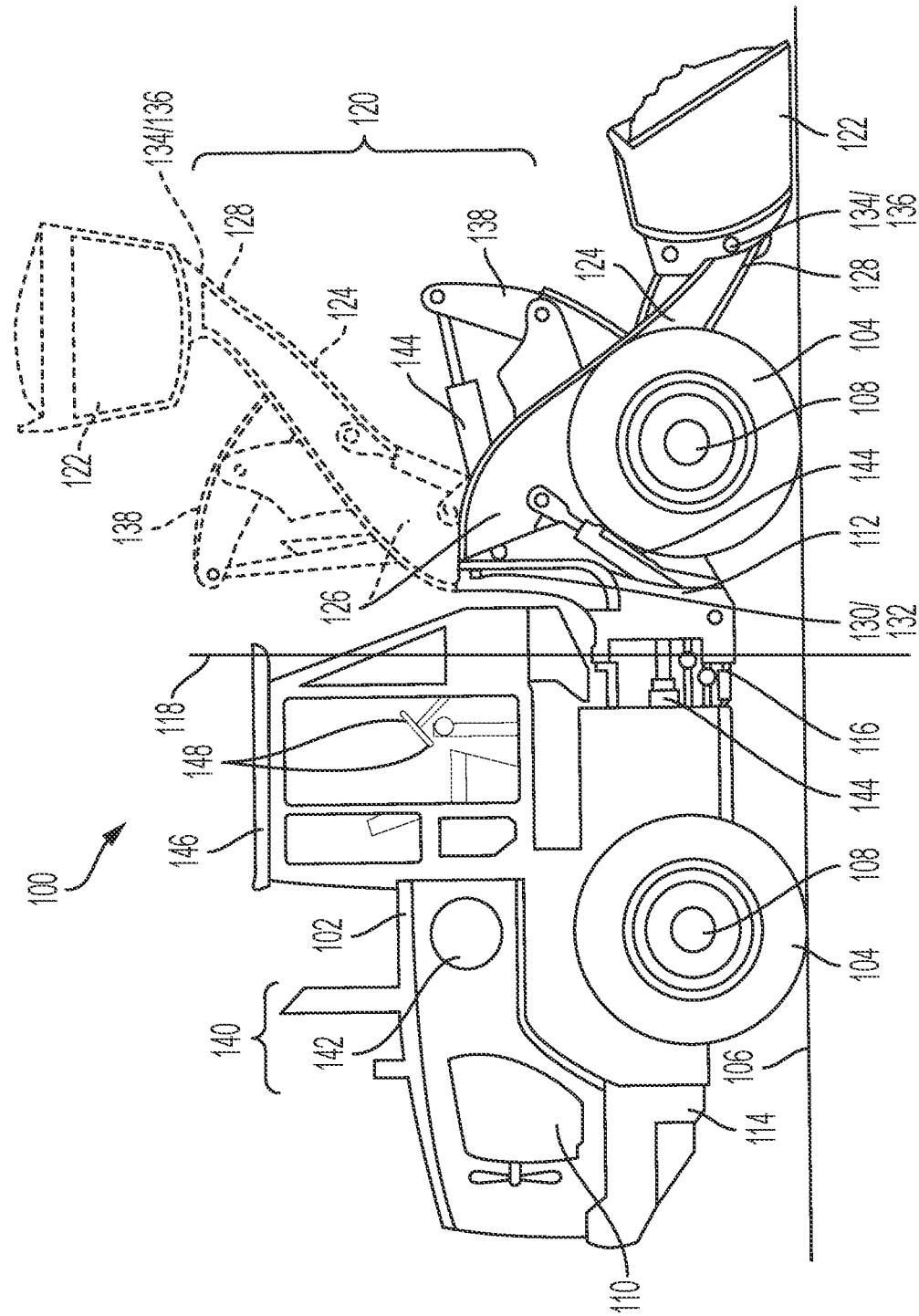
FIG. 1 is a side elevational view of an example of a complex mechanical machine in the embodiment of a wheel loader including an articulate machine frame and an implement linkage coupled to and configured to raise and lower a work implement like a bucket with respect to the machine frame.

Now referring to the figures, wherein whenever possible like reference numbers refer to like elements, there is illustrated an example of a complex mechanical machine in the form of a wheel loader 100 configured for lifting, hauling, and dumping materials such as soil, aggregate, rock, or the like. Wheel loaders 100 may be used in construction operations like earth moving, excavation, material handling and similar operations. While the present disclosure is described with respect to a wheel loader, the disclosure is applicable to any mechanical machine have moving parts that are joined together by one or more kinematic joints and that require periodic lubrication with a lubricant like grease or oil.

The wheel loader 100 can include a machine frame 102 supported on a plurality of wheels 104 that can rotate with respect to the frame to enable the wheel loader to move over the ground 106 or surface of a worksite. To enable rotation, the wheels 104 can be coupled to the machine frame through axle joints 108 or axial bearings that support a rotating axle fixed to the wheel. The wheels 104 may be further configured as powered drive wheels to which rotational torque is applied to drive the wheel loader 100 over the ground 106 and as steerable wheels that can be used to steer the wheel loader as it travels with respect to the ground.

To generate power for the drive wheels, the wheel loader 100 can include a prime mover or power plant in the form of an internal combustion engine 110 supported on the machine frame 102. The internal combustion engine 110 can combust a hydrocarbon-based fuel to convert the potential chemical energy therein to rotational power or torque the machine 100 can harness for other work. Examples of suitable fuels to combust include diesel, gasoline, or less traditional fuels such as biofuels, natural gas, etc. In addition to providing power to the drive wheels, the internal combusting engine 100 can provide power to other operational systems and mechanisms associated with the wheel loader 100.

To facilitate steering of the wheel loader 100 with respect to the ground 106, the machine frame 102 may be an articulated machine frame including a forward frame end 112 and a rearward frame end 114 pivotally coupled together at a frame joint 116. The frame joint 116 enables the forward frame end 112 and reward frame end 114 to pivot with respect to an articulation axis 118 that extends vertically through the frame joint 116. Accordingly, the wheels 104 located at the forward frame end 112 can be aligned in a different direction than the wheels located at the rearward frame end 110. The articulated machine frame 102 enables the wheel loader 100 to make shaper turns when maneuvering over the ground 106.

To enable the wheel loader 100 to lift and haul material in accordance with its operative purpose, the wheel loader can include an implement linkage 120 coupled to a work implement 122. In the example of a wheel loader 100, the implement linkage 120 may be a lifting implement and the work tool 122 may be a bucket. More particularly, the implement linkage 120 can include one or more elongated lift arms 124 that can be made from rigid, structural steel and can extend between a proximal frame end 126 and a distal tool end 128. To raise and lower the lift arms 124 with respect to the machine frame 102, the proximal frame end 126 can be connected to the forward frame end 112 by a lift joint 130 that enables the lift arms to pivotally articulate with respect to the forward frame end. The lift joint 130 may be configured as a pivot joint and may define a lift axis 132 parallel to the ground and that extends through the location where the proximal frame end 126 is coupled to the forward frame end 112. By pivoting with respect to the lift axis 132, the implement linkage 120 is able to move between a lowered position with the work tool 122 adjacent the ground and a raised position with the work tool vertically evaluated above the ground.

By pivoting as described, the lift joint 130 is therefore able to articulate the implement linkage 120 through a range of angular motion with respect to the machine frame 102. The ranges of angular motion may be referred to as different geometric configurations of the implement linkage 120 and may be associated with different tasks or functions being conducted, such as hauling, digging, or dumping. It can be appreciated that rather than allowing for full, 360 degree rotation, the angular range of articulation of the lift implement provided by the lift joint 130 may be constrained between the lowered position and the raised position as illustrated in FIG. 1.

In the example of a bucket, the work tool 122 can be an opened box-like structure configured to receive and contain material received from and hauled with respect to the ground 106. To haul and dump the material, the bucket may be pivotally connected to the distal tool end 128 of the lift arms 124 by a tilt joint 134. The tilt joint 134 defines a tilt axis 136, also horizontal with respect to the ground 106, which the work tool 122 can pivot with respect to the lift arms 124 associated with the implement linkage 120. In addition, to tilt the bucket, the implement linkage 120 can include one or more rigid structural members like a tilt arm 138 that are also pivotally connected, either directly or indirectly together, to facilitate pivotal articulation of the implement linkage 120 and work tool 122 with respect to each other and the machine frame 102.

To provide motive power to enable the forward frame end 112 and the rearward frame end 114 of the articulated machine 102 to articulate with respect to each other, as well as to enable the implement linkage 120 and the work tool 122 to pivot with respect to the machine frame 102, the wheel loader 100 can be operatively associated with a hydraulic system 140. The hydraulic system 140 can be configured to direct pressurized hydraulic fluid to one or more hydraulic actuators that convert the fluid pressure to mechanical motion. To pressurize the hydraulic fluid, the hydraulic system 140 can include a hydraulic pump 142 and the hydraulic actuator may be a plurality of hydraulic cylinders 144 disposed about the machine frame 102. The hydraulic cylinders 144 can include a cylindrical rod that can telescopically extend from or retract into a tubular cylinder body in response to the fluid pressure therein. In the illustrated embodiment of a wheel loader, the hydraulic cylinders 144 may include a frame cylinder to actuate the frame joint 116, a lift cylinder to actuate the lift arms 124 of the implement linkages, and a tilt cylinder to actuate tilting of the work tool 122 with respect to the lift arms.

To accommodate an operator, the wheel loader 100 can include an onboard operator cab 144 or operator station disposed on the machine frame 102 at a location providing visibility over the ground 106 and about the worksite. The operator cab 146 can include a plurality of various input/output interfaces 148 like a steering wheel, acceleration pedals, brakes, shift levers, control levers, joysticks, and the like that enable the operator to direct operation of the wheel loader including, by way of example, the implement linkage 120. The wheel loader 100 may also be configured for remote operation and the interfaces associated with the operator cab 144 may be located off-board at a remote location.

The articulated machine frame 102 and the implement linkage 120 coupled to the work tool 122 are examples of kinematic linkages in which rigid links or bodies are able to articulate, rotate, or otherwise move with respect to each other. The frame joint 116, the lift joint 130 and the tilt joint 134 are thus examples of kinematic joints that enable the rigid bodies, such as the forward and rearward frame ends 112, 114, the lift arms 124, and the work tool 122, to pivotally articulate or otherwise move between the different geometric configurations. In a complex mechanical machine such as the illustrated wheel loader 100, the kinematic joints may be subjected to significant cyclic and repeated loads and stresses. For example, the implement linkage 120 via the lift joint 130 may repeatedly move between the raise position or configuration and the lowered position or configuration, which may be referred to as a work cycle associated with digging, hauling, and dumping material. The frame joint 116 and the tilt joint 134 may likewise be cyclically moved through the same range of angular motion. To reduce friction and increase component wear life associated with motion of those kinematic joints under the applied loads, the wheel loader 100 may be operatively associated with an automatic lubrication system to dynamically direct a fluid or viscous lubricant to the kinematic joints.

Figure 2:
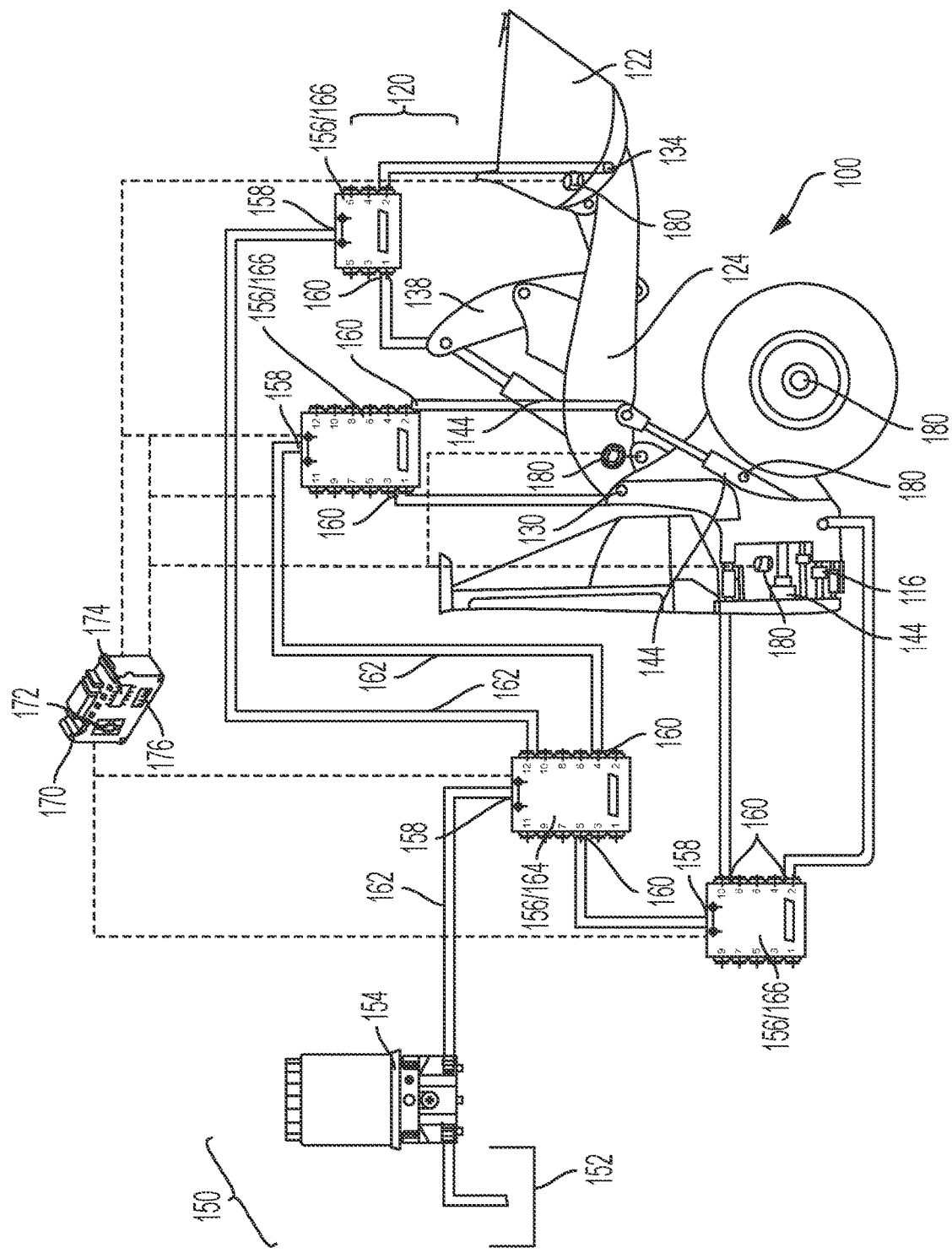
FIG. 2 is a schematic diagram of an automatic lubrication system including a lubricant pump and a plurality of flow control valves configured to dynamically direct lubricant to a plurality lubrication points each associated with kinematic joints and disposed about the mechanical machine of FIG. 1.

Referring to FIG. 2, there is illustrated an example of an automatic lubrication system 150 that can be used with a complex mechanical machine like the wheel loader 100. The lubricant used with the lubrication system 150 can be any suitable lubricant such as an oil or grease that has a suitable viscosity and can be made to flow. To accommodate the lubricant, the automatic lubricant system 150 can include a lubricant reservoir 152 or storage tank. To pressurize and direct the lubricant from the lubricant reservoir 152 to the different lubrication points about the wheel loader, the lubricant system 150 can include a lubricant pump 154. The lubricant pump 154 can be any suitable type of pump such as a gear pump with internal intermeshing gears. Relative rotation of the intermeshing gears will displace and direct the grease or other viscous lubricant though the automated lubrication system 150. The lubricant pump 150 may also be driven by a stepper motor than can be controlled so the lubricant pump can deliver a metered amount of lubricant upon receiving an appropriate command. Alternatively, the lubricant pump can be a variable displacement pump.

To distribute the lubricant to the plurality of lubrication points that may correspond to the kinematic joints, the automatic lubrication system 150 can include a plurality of selectively configurable flow distribution valves 156. The flow distribution valves 156 may be configured as valve blocks having an inlet port 158 and a plurality of outlet ports 160. The outlet ports 160 can be selectively opened and closed by the internal mechanics of the flow distribution valves 156. The inlet port 158 can receive lubricant that the flow distribution valves 156 selectively distribute to the outlet ports 160 to direct lubricant onto the intended lubrication points. The internal mechanisms of the flow distribution valves may cooperate to adjust or vary the quantity and/or flowrate of lubricant from any individual outlet port 160. The lubricant pump 154 and the plurality of flow distribution valves 156 can be fluidly connected by suitable fluid conduits 162 such as hoses or rigid tubes.

In an embodiment, the lubricant distribution system 150 can be tiered system in which the plurality of flow distribution valves 156 are arranged such that one may function as a primary valve 164 that selectively directs lubricant onto a plurality of secondary valves 166 that are fluidly connected with the primary valve. Moreover, each of the secondary valves 166 can be operatively arranged to direct lubricant to one or more kinematic joints associated with a particular kinematic linkage of the wheel loader such that each secondary valve 166 is associated with that group of joints. For example, one of the secondary valves 166 can be associated with the frame joint 116 that enables the forward frame end 112 of the articulated machine fame 102 to articulate with respect to the rearward frame end 114. Another secondary valve 166 may be operatively associated with the lift joints 130 that enable the lift arms 124 of the implement linkage 120 to pivot with respect to the forward frame end 112. Another secondary valve 166 can be associated with the tilt joint 134 that couples the work tool 122 to the lift arms 122 of the implement linkage 120.

To regulate and selectively control operation of the automatic lubrication system 150, the lubrication system can be associated with a computing device such as an electronic control unit (ECU), electronic control module (ECM), or, as referred to herein, an electronic controller 170. The electronic controller 170 can be a programmable computing device and can include one or more microprocessors 172, non-transitory computer readable and/or writeable memory 174 or a similar storage medium, input/output interfaces 176, and other appropriate circuitry for processing computer executable instructions, programs, applications, and data. The microprocessor 162 of the electronic controller 170 may be configured to process digital data in the form of binary bits and bytes and can have any suitable configuration such as an application specific integrated circuit (ASIC), a field programmable gate array (FPGA), or a similar configuration. In addition to regulating the automatic lubrication system 150, the electronic controller 170 may be responsible for monitoring and regulating operation of the other systems and devices associated with the wheel loader or other complex mechanical machine. Although illustrated as a unitary device, the electronic controller 170 and its functionality may be distributed among a plurality of computing devices.

The electronic controller 170 can be in electronic communication with the plurality of flow distribution valves 156 via electronic data buses or a similar electronic communication network such as conductive wires or the like. The electronic controller 170 can communicate appropriate analog or digital data signals to selectively configure the flow distribution valves 156 to open or close the desired inlet and outlet ports 158, 160 to selectively distribute the lubricant to the lubrication ports associated with the kinematic joints in a desired manner.

To determine which kinematic joints require lubrication, the electronic controller 170 can be operatively associated with and in electronic communication with a plurality of machine sensors 180. The machine sensors 180 are able to monitor and detect changes with the operating states associated with the wheel loader or other complex machine and communicate electronic data signals indicative of those changes back to the electronic controller 170. Any of various suitable machine sensors can be used to assist the electronic controller 170 in automatically controlling operation of the automatic lubrication system 150.

By way of example, the machine sensors 180 may be directly associated with the kinematic linkages and may directly monitor the positional or motion states of the kinematic joints. The machine sensors may be rotary sensors or rotary encoders and can be disposed in proximity to the frame joint 116, the lift joint 130, and/or the tilt joint 134, each of which may be revolute or pivot joints. Accordingly, when the rigid links associated with the pivot joints articulate with respect to each other, the machine sensors 180 monitor and communicate the amount of angular rotation to the electronic controller 170. Furthermore, if the electronic controller 170 is programmed with or can access the dimensions and kinematic values associated with the kinematic linkages, the electronic controller can calculate and determine the relative positions, i.e. geometric configurations, of the various links and rigid bodies associated with the linkage. In other words, the electronic controller 170 can infer or estimate the positions and arrangement of the moving linkages and components of the wheel loader based on current data from the machine sensors and the predetermined or fixed information regarding the machine dimensions, which may be stored in the computer readable memory 174 associated with the electronic controller 170. In such case, the machine sensors 180 can also function as position sensors.

In addition to being directly associated with the kinematic linkages and joints, the machine sensors 180 can measure the operational data associated with the wheel loader or other complex mechanical machine. For example, the machine sensors 180 can be pressure sensors and can be associated with the hydraulic cylinders 144 that actuate, for example, the frame joint 116, the lift joint 130, or the tilt joint 134. By monitoring the hydraulic pressure in the hydraulic cylinders 144, the machine sensors 180 and the electronic controller 170 can directly or indirectly determine the loads or forces applied at a particular kinematic joint. Further, by monitoring the positions of the hydraulic cylinders 144, the machine sensors 180 and the electronic controller 170 can determine the relative positions, i.e., geometric configurations, of the rigid links or bodies associated with the kinematic linkages.

Other examples of machine sensors and operational data that may be monitored include data regarding the internal combustion engine 110, such as fuel consumption or power output, and temporal data, for example, associated with the speed or velocity at which the wheel loader or mechanical machine is operating. The electronic controller 170 can also be in communication with and receive information regarding machine operations commanded by a human operator through the use of the input/output interfaces in the operators' cab.

The electronic controller 170 can be configured to receive operational data from the plurality of machine sensors 180 to determine the timing and amount of lubricant to direct and introduce via the automatic lubrication system 150 to lubrication points associated with the plurality of kinematic joints of the wheel loader 100 or other mechanical machine. For example, the electronic controller 170 can process the received operational data with predetermined data and information regarding past or historic operation of the machine, geometric or dimensional data regarding the kinematic linkages associated with the kinematic joints, and with other data and information to determine the timing and the appropriate quantity of lubricant to supply. Accordingly, the electronic controller 170 and the automatic lubrication system 150 can selectively and responsively lubricate the plurality of kinematic joints in accordance with the actually operating characteristics and loads or forces applied to the kinematic joints.

Figure 3:
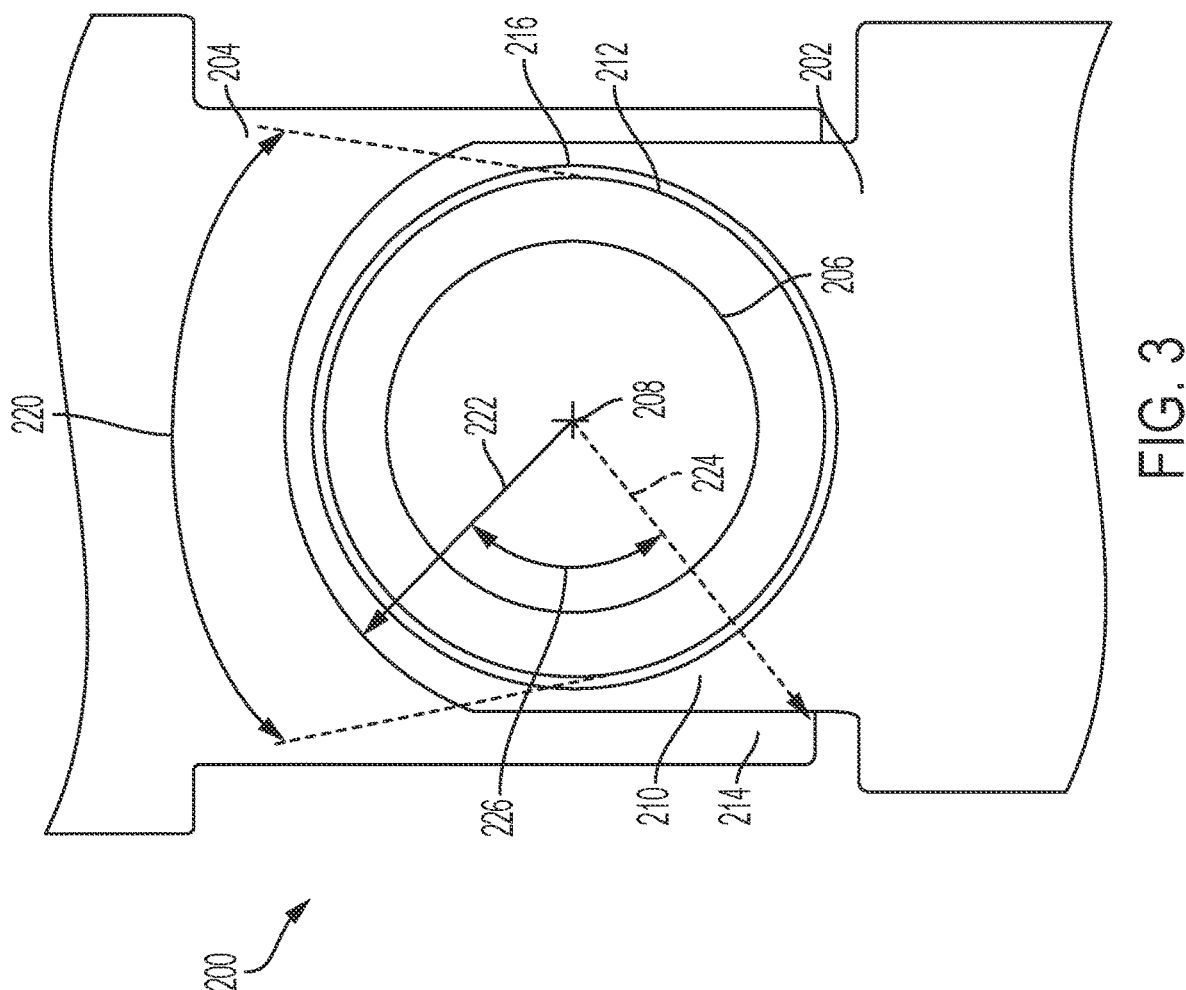
FIG. 3 is schematic representation of a kinematic joint in the form of a pin joint having a plurality of relative angular positions defining the range of different angles of rotation through which angular motion of the pin are constrained.
Figure 4:
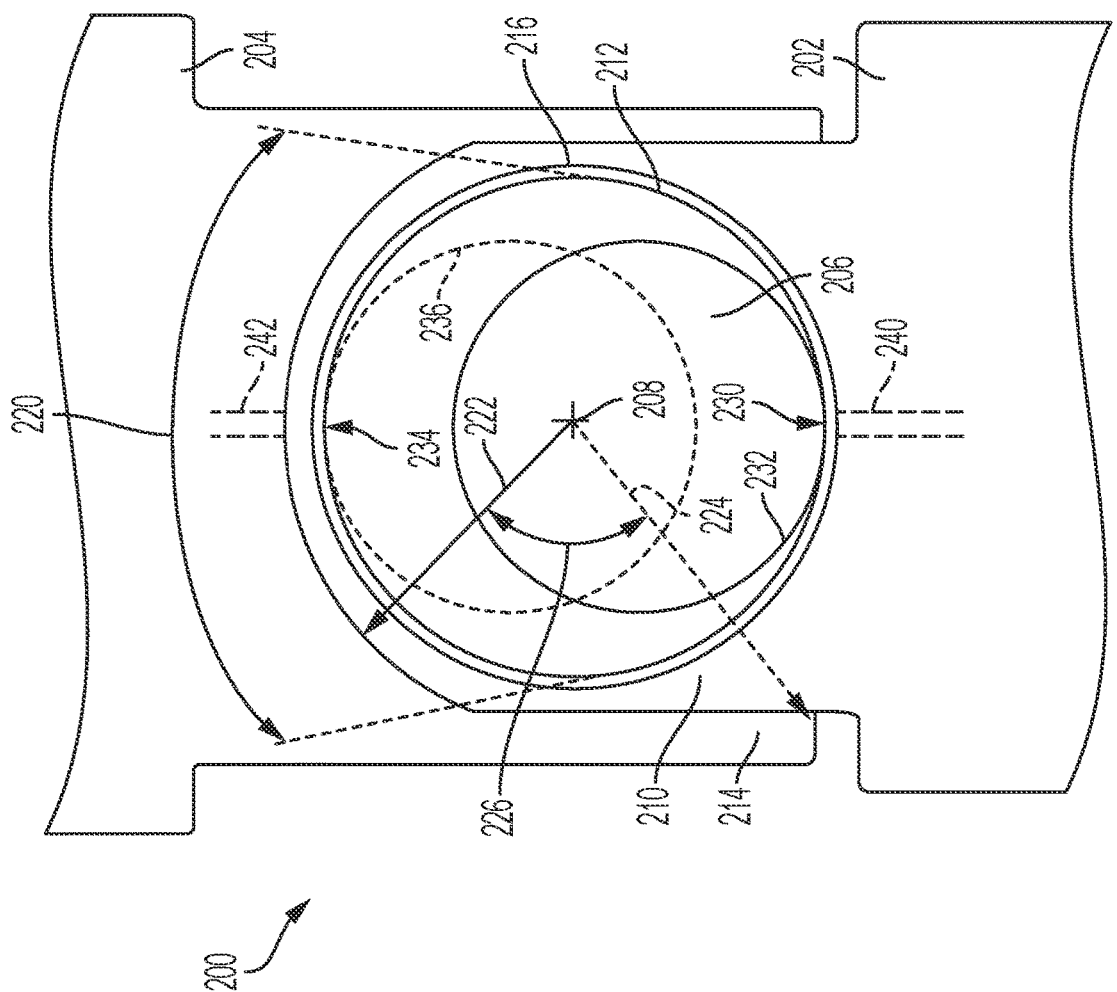
FIG. 4 is a schematic representation of the kinematic joint of FIG. 3 illustrating possible lubricant introduction positions for the advantageous introduction of lubricant to the joint.

For example, referring to FIGS. 3 and 4, there is schematically illustrated an example of a kinematic joint 200 in which a first rigid link 202 or body and a second rigid link 204 are pivotally coupled together by an elongated cylindrical pin 206 so that they can articulate with respect to each other about a pivot axis 208. Formed on the first rigid link 202, for example, at a distal end, can be a ring-shaped structural eye 210 that defines a circular aperture 212 disposed there through. The second rigid link 204 can also include a ring shaped structural eye 214 that may include a similar sized circular aperture. When the first rigid link 202 and the second rigid link 204 are placed in an axially adjacent, abutting relation with respect to the pivot axis 208, the cylindrical pin 206 can be concentrically inserted through the aligned circular apertures 212 to interconnect the first and second rigid links 202, 204. The cylindrical pin 206 and the circular apertures 212 may be sized to form a sliding fit there between, however, for demonstrative purposes, the figures show an annular gap or space there between. In an embodiment, a sleeve bearing 216 may be disposed in the aperture 212 to make sliding contact with the pin 206. Although the illustrated example of the kinematic joint 200 may be referred to as specifically a pivot joint, pin joint, or a revolute joint, the disclosure is applicable to other types of kinematic joints and the figures are not intended as a limitation or constraint regarding the disclosure.

The sliding fit between the cylindrical pin 206 and the circular apertures 212 allow the first and second rigid links 202, 204 to pivot or articulate with respect to each other and with respect to the pivot axis 208 that may serve as a fixed point of reference. Accordingly, the location of the pivot axis 208 and the circular aperture 212 defined by the first and second structural eyes 210, 214 can serve as a frame of reference or coordinate system via which rotation and relative motion of the kinematic link 200 can be represented. The range that the first and second rigid links 202, 204 can rotate with respect to each other may be unconstrained such that the kinematic joint can complete a full 360° rotation. However, in other cases, the range of relative rotation, or the angle of rotation, may be constrained to less than a full rotation, as indicated by the dashed arc 220 in FIG. 3. The angle of rotation 220 may be constrained by, for example, external bodies. In the example of a wheel loader 100 in FIGS. 1 and 2, it can be appreciated that the forward frame end 112 and the rearward frame end 114 of the articulated machine frame 102 cannot make a full rotation without contacting each other to prevent further motion. Likewise, the implement linkage 120 cannot make a full rotation with respect to the forward frame end 112 without contacting the forward frame end and preventing further rotation.

In addition to the angle of rotation, the kinematic joint 200 can be associated with or demonstrate different relative angular positions. For example, because the first structural eye 210, the second structural eye 214, and the cylindrical pin 206 can rotate relative to each other, they may assume different relative or respective angular positions or orientations. As a further example, at one instance the angular position of the first structural eye 210, indicated by the shorter arrow 222, may be angularly aligned with the angular position of the second structural eye 214 indicated by the longer dashed arrow 224. At a second instance, the angular position 222 of the first structural eye 210 and the angular position 224 of the second structural eye 214 may be angularly offset. The different angular positions 222, 224 of the first structural eye 210 and the second structural eye 214 may be referred to as the relative angular positions of the kinematic joint 200. In the FIGS, the relative angular position may be schematically indicated by the arrow 226 between the angular position 222 of the first structural eye 210 and the angular position 224 of the second structural eye 214.

The different relative angular positions of the kinematic joint 200 and external load states may result in different loading characteristics on the kinematic link 200. For example, referring to FIG. 3, when the angular positions of the first structural eye 210, the second structural eye 214, and the cylindrical pin 206 are aligned, the three structures may be concentric to each other. However, referring to FIG. 4, when the relative angular positions of the first structural eye 210, the second structural eye 214, and the cylindrical pin 206 are angularly offset, the three structures may move to an eccentric relation with each other. For example, in one relative angular position of the kinematic joint 200, the cylindrical pin 206 may forcibly move against a first segment 230 or arch of the apertures 212 disposed through the first and second structural eyes 210, 214 as indicated by the solid circle 232. That may result in friction and wear at the first segment 230 due to forcible contact between the cylindrical pin 206 and the first and second structural eyes 210, 214. In another relative angular position of the kinematic joint 200, the cylindrical pin 206 may forcibly move against a second segment 234 of the apertures 212, as indicated by the dashed circle 236, resulting in friction and wear along the second segment.

The different orientations of the pin 206 alternatively between the first and second segments 230, 234 may be attributable to the different geometric configurations that the kinematic linkage assumes during different tasks, or during different aspects of performing a task. In the example of a wheel loader 100, the pin 206 may abut against the first segment 230 when the implement linkage is in the lowered position and loads and forces are directed generally horizontally through the lift arms 124 to the lift joint 130 during a digging operation. The pin 206 abut against the second segment 234 when the implement linkage is in the raised position and the loads and forces are directly generally vertically through the lift arms 124 to the lift joint 130. Moreover, because of the cyclic nature of the work tasks, the pin 206 may repeatedly and cyclically move between abutting contact with the first and second segments 230, 234. The frame joint 116 and tilt joints 134 may undergo similar cyclic loading conditions as the wheel load moves between different geometric configurations.

Further, the eccentric offset of the first structural eye 210, the second structural eye 214, and the cylindrical pin 206 due to the different relative angular positions 226 of the kinematic joint 200 can interfere with lubrication of the kinematic joint. For example, if the pin 206 is abutted against the first segment 230 or the second segment of the aperture 212 when lubricant is introduced, the lubricant may be prevented from reaching the first and/or second segments. Further, the automatic lubrication system may include a lubrication position associated with a lube port 240 disposed through the first structural eye 210 and discharge within the first segment 230. If the relative angular positions of the kinematic joint 200 causes the cylindrical pin 206 to abut the second segment 230, lubricant is blocked and prevented from entering the aperture 212 of the kinematic joint. Likewise, a second lube port 242 is disposed in the second structural eye 214, under certain relative angular positions of the kinematic joint 200 the cylindrical pin 206 may forcibly abut against second segment 234 and block and prevent lubrication from being introduced through the second lube port 242.

INDUSTRIAL APPLICABILITY

In accordance with the disclosure, the electronic controller 170 associated with the wheel loader 100 or similar mechanical machine may be programmed to conduct kinematic computations to facilitate lubrication of the various kinematic joints associated with the machine using the automatic lubrication system 150. For example, the electronic controller 170 can determine appropriate instances to deliver lubricant to a kinematic joint 200 based on machine operational data, or may determine the appropriate quantities of lubricant to deliver based on geometry data associated with the kinematic joint and the kinematic linkage. The kinematic equations can be conducted by computer executable software programs and applications written in a computer readable programing language.

Figure 5:
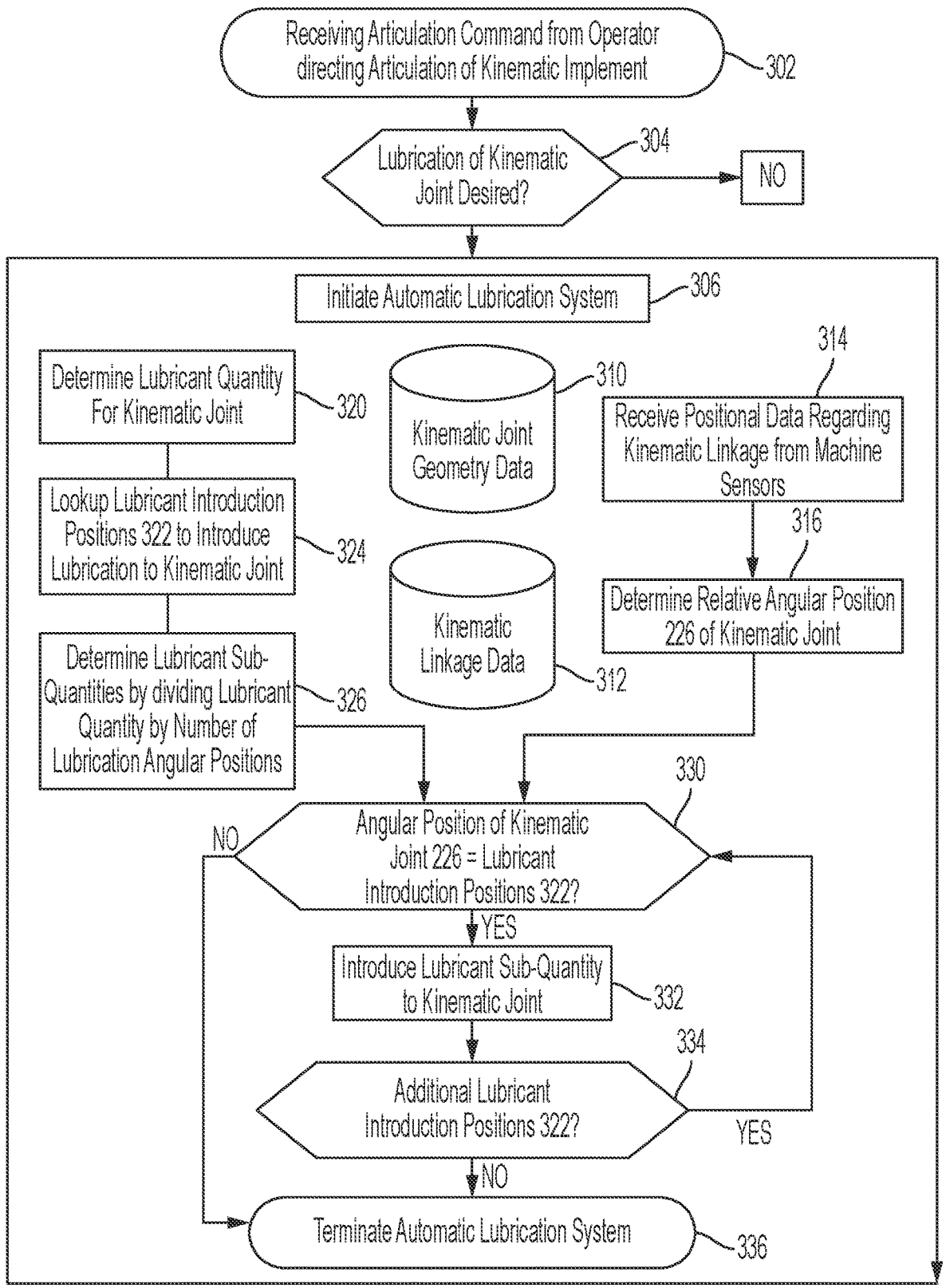
FIG. 5 is a flow diagram of a possible process or method for determining when and how much lubricant should be directed and introduced to a lubrication point associated with a kinematic joint.

For example, referring to FIG. 5 and with continued reference to the earlier figures, there is illustrated a possible process 300 for determining the timing and quantity of lubricant to deliver to a kinematic joint 200 like the frame joint 116, the lift joint 130, and the tilt joint 134. The process 300 can be initiated by receiving, in a receiving step 302, an articulation command 302 from an operator directing articulation or movement of the kinematic linkage. The process 300 can next determine, in a lubrication query step 304, whether lubrication of one or more kinematic joints 200 is desired. The lubrication query step 304 can be based on, for example, operating time of the machine, frequency of articulation of the kinematic joint, or other operating parameters and conditions as explained below.

If lubrication is desired, the process 300 can, in an initiation step 306, initiate the automatic lubrication system 150 and the electronic controller 170 can conduct various kinematic assessments to determine the timing and quantity of lubrication to deliver using current operational data regarding motion of the linkage and predetermined data regarding geometry and the dimensions of the wheel loader or mechanical machine. For example, the electronic controller 170 can access data and information like kinematic joint geometry data 310 and kinematic linkage data 312 that can be stored as computer processible data in the computer readable memory 174 associated with the controller 170. Examples of kinematic joint geometry data 310 can include the bore size and axial length of the aperture in the case of a revolute joint. Examples of kinematic linkage data 312 can include length or mas of the lift arms 124. Kinematic joint geometry data 310 and kinematic linkage data 312 can be fixed by design and can be predetermined prior to operating the automatic lubrication system 150.

The process 300 can also utilize the machine sensors 180 to monitor and gather current operational data regarding the kinematic linkage and kinematic joints 200 therein. For example, in a positional data reception step 214, the electronic controller 170 can receive data regarding the present geometric configuration or arrangement of the kinematic linkage, such as the linkage formed by the articulated machine frame 102 or implement linkage 120 that may assume different positions during use. Other information and data associated with the kinematic linkage may regard motion or the movement currently undertaken by the kinematic linkage, including directional information, velocity, acceleration, or the like.

By analyzing the positional data received by the positional data reception step 314, the electronic controller 170 can determine information specifically related the kinematic joints 200 associated with the kinematic linkage that may be, for example, the frame joint 116, the lift joint 130, and the tilt joint 134. For example, the positional data may be analyzed to determine the relative angular position of the kinematic joint 200 in an angular position determination step 316. The relative angular position 226 may be measured directly, for example, if the machine sensors 180 are rotary sensors or encoders affixed directly to the kinematic joint 200, or the relative angular position may be determined indirectly, for example, by using other information like extension or retraction of the hydraulic cylinders 144.

The process 300 can also determine the quantity of lubricant to deliver to a kinematic joint 200. For example, in a lubricant quantity determination step 320, the electronic controller 170 can use the kinematic joint geometry data 310, such as bore size and axial length, to determine the appropriate quantity of lubricant to introduce to the kinematic joints 200, and which may be calculated in units of volume like milliliters or cubic centimeters.

In an embodiment, the kinematic linkage and/or kinematic joint may be associated with a plurality of lubricant introduction points that may correspond to advantageous configurations of the linkage or joint for the reception of lubricant to ensure lubricant adequately flows between the components of the kinematic joint. For example, referring to FIG. 4, the kinematic joint 200 includes the first lube port 240 and the second lube port 242 that may correspond to different relative angular positions with respect to the kinematic joint. Depending upon the eccentric offset or loading of the pin 206 within the aperture 212, the first or second lube ports 240, 242 may be obstructed preventing introduction of lubricant. The unobstructed lube port 240, 242 will therefore be advantageous lubricant introduction position 322 for introducing lubricant.

The process 300 may account for the plurality of different lubricant introduction positions 322 to further quantify the amount of lubrication introduced via the different lube ports 240, 242 or the like. For example, in a position lookup step 324, the electronic controller 170 can lookup the number and/or locations of the lubricant introduction positions 322 that are advantageous for a particular kinematic joint 200. The number and locations of lubricant introduction positions 322 may be determined by design and can be stored in the computer readable memory 174 associated with the electronic controller 170. In a further lubricant sub-quantity determination step 326, the process 300 can divide the lubricant quantity determined by the lubricant quantity determination step 320 by the number of lubricant introduction positions 322 to arrive at volumetric values for sub-quantities of lubricant to be introduced through the individual lube ports 240, 242.

After the process 300 has determined the appropriate amount of lubricant to introduce to the individual kinematic joints 200, the process 300 can perform further steps to determine the advantageous instances or times for delivering the lubricant. For example, in a position comparison step 330, electronic controller 170 can periodically or continuously compare the relative angular position 226 of the kinematic joint 200 with the lubricant introduction positions 322 associated with the kinematic joint 200. Specifically, as the first and second rigid links 204, 206 of the kinematic joint 200 rotate with respect to each other, the kinematic joint assumes different and changing relative angular positions. If the current relative angular position 226 of the kinematic joint 200 aligns or equates with an advantageous lubricant introduction position 322, the electronic controller can conduct a lubricant introduction step 332 that causes the automatic lubrication system 150 to direct lubricant to the kinematic joint 200 in an amount determined by the lubricant quantity determination step 320 or the lubricant sub-quantity determination step 326.

Because the kinematic joint 200 may include or be associated with a plurality of advantageous lubricant introduction positions 322, the process 300 may repeat the position comparison step 330. For example, the process 300 may include a decision step 334 that queries if there are additional lubricant introduction positions 322 and will return to the position comparison step 330 to continually compare the present relative angular position 226 of the kinematic joint with the lubricant introduction positions 322. Accordingly, if during the course of a work cycle, the kinematic joint 200 can assume different relative angular positions 226 that may correspond to different lubricant introduction positions 322, the process 300 can account for and proceed through that variability. If there are no further lubricant introduction positions 322, the process 300 can proceed to a termination step 336 and terminate.

Figure 6:
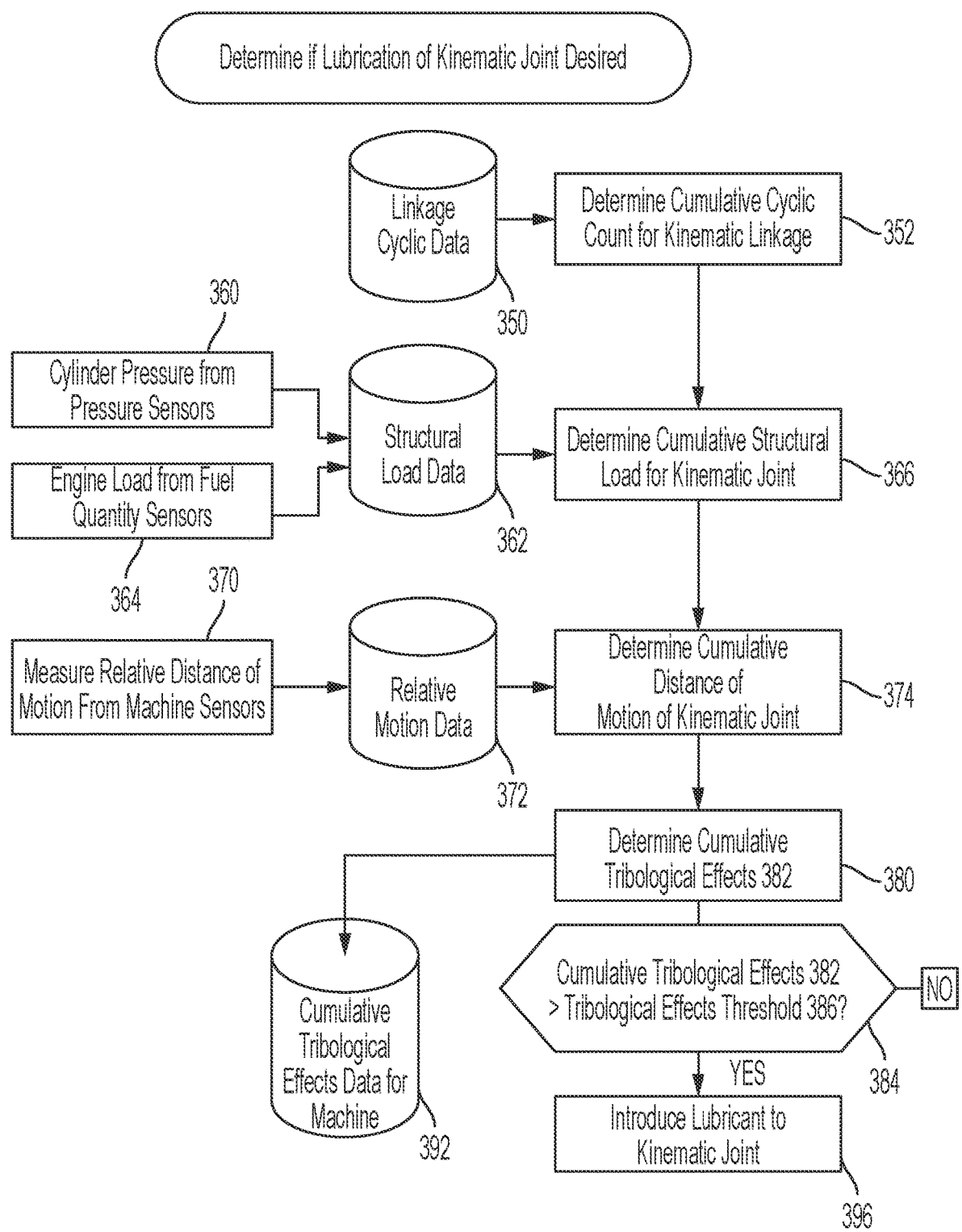
FIG. 6 is a flow diagram of a possible process or method for determining when lubricant should be directed and introduced to a lubricant introduction position associated with a kinematic joint.

As described, the process 300 can include a lubrication query step 304 in which the electronic controller 170 may process data and information to determine the desirability of lubricating a particular kinematic joint 200. Referring to FIG. 6, there is illustrated examples of the types of data and information that can be accessed by and processed through the lubrication query step 304. For example, as stated, the kinematic linkage including the kinematic joints 200 therein may undergo or be moved through cyclic, repeated steps during operation. The process 300 may include functionality to monitor and track the linkage cyclic data 350, which can be retained and stored as computer processible data in the computer readable memory 174 associated with the electronic controller 170. The process 300 may further include functionality such as a cumulative cyclic count step 352 to increment or increase the linkage cycle data 350 each time the kinematic linkage is moved through all or part of an operative work cycle. The process 300 can thus result in an updated or current cumulative cyclic count.

In another example, the process 300 may include functionality to analyze the structural loading, forces, and stresses imparted on a kinematic joint 200 in querying whether lubrication is desired. For example, the electronic controller 170 can use the machine sensors 180 to conduct a pressure measurement step 360 to measure the hydraulic pressure associated with one or more of the hydraulic cylinders 144 that are operatively associated with the kinematic linkage to actuate the kinematic joints 200 therein. From the hydraulic pressure measured in the hydraulic cylinders 144, the electronic controller 170 can determined the structural loads that are applied to the kinematic linkages of the wheel loader or mechanical machine, which can be stored structural load data 362 that can be a form of computer processible data in the computer readable memory 174 associated with the electronic controller 170.

Another example of structural load data 362 can be engine load data 364, which may be obtained by measuring the power output by the internal combustion engine 100 or other prime mover associated with the wheel loader 100. For example, electronic controller 170 can estimate the power output if the machine sensors 180 are fuel quantity sensors by measuring the quantity of fuel combusted during machine operation. The quantity of fuel consumed can be an indication of the load and work performed by the wheel loader 100. In a structural load summation step 366, the electronic controller 170 can sum the cumulative effects of the structural loads that are applied to the wheel loader 100 during the course of operation.

As another example of the types of data and information that can be used to determine the need to lubricate a kinematic joint 200 can be the distance of relative motion between one or more moving parts associated with the kinematic joint 200. For example, in FIG. 3 where the pin 206 forms a sliding fit within the apertures 212 of the first and second structural eyes 210, 212 the three structures will move with respect to each other and wear against each other. The electronic controller 170, in a distance measurement step 370, can measure or estimate the angular or linear distance the structures move with respect to and against each other, for example, via machine sensors 180 that are rotary encoders or other kinematic sensors. The measured distances can be stored as the distance of relative motion data 372 and which can be added over time in a relative motion summation step 374 to produce the cumulative relative motion between the components of the kinematic joint 200.

The process 300 can use the cumulative cyclic count, the cumulative structural load, and/or the cumulative distance of relative motion, to assess the desirability or need to lubricate a kinematic link 200. For example, in a tribological effects summation step 380, the electronic controller 170 can sum or perform other mathematical operations on the values obtained to determine the cumulate tribological effects 382 that have been applied to the kinematic link 200 during operation. The current tribological effects 382 may refer to frictional wear and deterioration of the components of the kinematic joint due to relative abrasive motion. The current tribological effects 382 may also refer to deterioration and breakdown of the lubricant, for example, grease or oil, that had been previously introduced to the kinematic joint 200 and thus requires replenishment.

In particular, the electronic controller 170 can conduct a tribological effect comparison step 384 in which the cumulative tribological effects 382 are compared with a tribological threshold 386 that may be predetermined empirically and that represents the appropriate or desirable time to reintroduce lubricant to the kinematic joint 200. If the tribological effect comparison step 384 indicates lubrication of the kinematic joint 200 is desirable, the process can proceed to a lubricant introduction step 390 in which the electronic controller 170 directs the automatic lubrication system 150 to direct lubricant to the kinematic joint. In a data storage step 392, the process 300 may also store historic data regarding the cumulative tribological effects 382 applied to the kinematic joint 200 which can be analysis to determine when to rebuild or repair the joint.

As stated above, the automatic lubrication system 150 may be a tiered system which the different flow direction valve 156 directing fluid to different lubrication points associated with different kinematic linkages and joints on the wheel loader or other mechanical machine. The electronic controller 170 may be operatively associated with a plurality of different kinematic joints, including for example the frame joint 116, the lift joint 130, and the tilt joint, and may independently and dynamically determine the timing and quantity of lubricant to direct to those joints based on the various different machine sensors 180. More specifically, the electronic controller 150 can separately assess which of the kinematic joints of the wheel loader, including the frame joint 116, the lift joint 132, and the tilt joint 134, requires lubrication based on individual readings from the machine sensors 180 operatively associated with those individual joints. The plurality of machine sensors 180 may be separated into a first group of machine sensors operatively associated with a first of the kinematic joints and a second group of machine sensors operatively associated with a second of the kinematic joints so the electronic controller 170 can separately receive and process operational data distinctly associated with the individual kinematic joints. The automatic lubrication system 150 can separately and distinctly direct lubricant in accordance with the quantities and timing determined by the process 300 described above. The tiered arrangement and the plurality of individual flow distribution valves 156 may assist in delivering tailored amounts of lubricant and specific times individually to the plurality of kinematic joints. Accordingly, the disclosure provides an automatic lubrication system that can dynamically lubricate a kinematic joint associated with a kinematic linkage using current operating conditions and geometric configurations of the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure and the protection to which applicant is entitled more generally. All language of distinction and disparagement with respect to certain features is intended to indicate a lack of preference for those features, but not to exclude such from the scope of the disclosure entirely unless otherwise indicated.

We claim:
1. A mechanical machine comprising:
a first kinematic linkage including a first kinematic joint movably coupling a first rigid link and a second rigid link;
a second kinematic linkage including a second kinematic joint movably coupling a third rigid link and a fourth rigid link;
an automatic lubrication system in fluid communication with the first kinematic joint and with the second kinematic joint to deliver lubricant to the first kinematic joint and the second kinematic joint;
a plurality of machine sensors disposed to monitor articulation of the first kinematic joint and articulation of the second kinematic joint; and
an electronic controller in electronic communication with the plurality of machine sensors, the electronic controller programmed to:
estimate a first cumulative tribological effect associated with the first kinematic joint based on a first cumulative structural load measured with respect to the first kinematic joint;
direct the automatic lubrication system to direct lubricant to the first kinematic joint if the first cumulative tribological effect meets or exceeds a first tribological effect threshold associated with the first kinematic joint;
estimate a second cumulative tribological effect associated with the second kinematic joint based on a second cumulative structural load measured with respect to the second kinematic joint; and direct the automatic lubrication system to direct lubricant to the second kinematic joint if the second cumulative tribological effect meets or exceeds a second tribological effect threshold associated with the second kinematic joint.

2. The mechanical machine of claim 1, wherein the electronic controller is configured to estimate the first cumulative tribological effect and the second cumulative tribological effect distinctly from one another.

3. The mechanical machine of claim 2, wherein the plurality of machine sensors include a first group of machine sensors operatively associated with the first kinematic joint and a second group of machine sensors operatively associated with the second kinematic joint.

4. The mechanical machine of claim 1, wherein the electronic controller estimates the first cumulative tribological effect associated with the first kinematic joint and the second cumulative tribological effect associated with the second kinematic joint based on one or more of a cumulative cyclic count associated with a respective one of the first kinematic linkage and the second kinematic linkage and a cumulative distance of relative motion associated with a respective one of the first kinematic linkage and the second kinematic linkage.

5. The mechanical machine of claim 1, wherein the first kinematic joint and the second kinematic joint are pivot joints that each include a pin received in an aperture disposed respectively in the first rigid link, the second rigid link, the third rigid link, and the fourth rigid link.

6. The mechanical machine of claim 5, wherein the first kinematic joint is a lift joint coupling a lift implement with a machine frame and the second kinematic joint is a tilt joint coupling a work tool to the lift implement.

7. The mechanical machine of claim 1, wherein the plurality of machine sensors are disposed to measure a first relative angular position of the first kinematic joint and to measure a second relative angular position of the second kinematic joint.

8. The mechanical machine of claim 7, wherein the electronic controller is programmed to:
compare the first relative angular position of the first kinematic joint and the second relative angular position of the second kinematic joint with one or more lubrication introduction positions that are predetermined and associated with the first kinematic joint and the second kinematic joint; and
direct the automatic lubrication system to deliver lubricant to the first kinematic joint and the second kinematic joint based on the comparison of the first relative angular position and the second relative angular position with the one or more lubrication introduction positions.

9. A mechanical machine comprising:
a kinematic linkage including a kinematic joint movably coupling a first rigid link and a second rigid link;
an automatic lubrication system in fluid communication with the kinematic joint to deliver lubricant to the kinematic joint;
a machine sensor disposed to determine a relative angular position of the kinematic joint; and
an electronic controller in electronic communication with the machine sensor and programmed to compare the relative angular position of the kinematic joint with a lubricant introduction position and to direct the automatic lubrication system to deliver lubricant to the kinematic joint based on the comparison of the relative angular position and the lubricant introduction position.

10. The mechanical machine of claim 9, wherein the machine sensor is a rotary encoder operatively associated with the kinematic joint to directly determine the relative angular position.

11. The mechanical machine of claim 9, wherein the machine sensor is a position sensor operatively associated with one of the first rigid link or second rigid link to indirectly determine the relative angular position of the kinematic.

12. The mechanical machine of claim 9, wherein the lubricant introduction position includes a first lubricant introduction position and a second lubricant introduction position.

13. The mechanical machine of claim 12, wherein the first lubricant introduction position corresponds to a first geometric configuration of the kinematic linkage and the second lubricant introduction position corresponds to a second geometric configuration of the kinematic linkage.

14. The mechanical machine of claim 13, wherein the kinematic linkage is cyclically articulated between the first geometric configuration and the second geometric configuration.

15. The mechanical linkage of claim 9, wherein the electronic controller is further programmed to determine a lubricant quantity associated with the kinematic joint based on kinematic joint geometry data stored in computer readable memory associated with the electronic controller.

16. A method of automatically lubricating a kinematic joint coupling a first rigid link and a second rigid link of a kinematic linkage, the method comprising:
articulating the kinematic joint to a first relative angular position between the first rigid link and the second rigid link;
sensing the first relative angular position of the kinematic joint with one or more machine sensors;
comparing the first relative angular position of the kinematic joint with a first lubricant introduction position that is predetermined and associated with the kinematic joint; and
directing lubricant to the kinematic joint if the first angular position corresponds to the first lubricant introduction position.

17. The method of claim 16, further comprising:
articulating the kinematic joint to a second relative angular position between the first rigid link and the second rigid link;
sensing the second relative angular position of the kinematic joint with the one or more machine sensors;
comparing the second relative angular position of the kinematic joint with a second lubricant introduction position that is predetermined and associated with the kinematic joint; and
directing lubricant to the kinematic joint if the second relative angular position corresponds to the second lubricant introduction position.

18. The method of claim 17, wherein the first lubricant introduction position corresponds to a first geometric configuration of the kinematic linkage that may be monitored by the one or more machine sensors and the second lubricant introduction position corresponds to a second geometric configuration of the kinematic linkage that may be monitored by the one or more machine sensors.

19. The method of claim 18, wherein the kinematic linkage is cyclically articulated between the first geometric configuration and the second geometric configuration.

20. The method of claim 19, further comprising estimating a cumulative tribological effect associated with the kinematic joint based on one or more of a cumulative cyclic count, a cumulative structural load, and a cumulative distance of relative motion.

* * * * *